United States Patent
Rucki et al.

[11] Patent Number: 6,006,112
[45] Date of Patent: Dec. 21, 1999

[54] TRANSCEIVER WITH RF LOOPBACK AND DOWNLINK FREQUENCY SCANNING

[75] Inventors: John Stanley Rucki, New Providence; Christopher F. Zappala, Whitehouse Station; Jack Wen, Parsippany, all of N.J.

[73] Assignee: Lucent Technologies, Inc., Murray Hill, N.J.

[21] Appl. No.: 08/979,478

[22] Filed: Nov. 26, 1997

[51] Int. Cl.$^6$ ............... H03C 7/02; H01S 4/00; H04B 1/06
[52] U.S. Cl. ............ 455/561; 455/101; 455/133; 455/115; 455/560
[58] Field of Search .................... 455/560, 561, 455/562, 115, 64.4, 67.1, 78, 101, 133, 134, 135, 277.1, 275

[56] References Cited

U.S. PATENT DOCUMENTS

| | | |
|---|---|---|
| 4,123,759 | 10/1978 | Hines et al. .................. 343/854 |
| 4,914,714 | 4/1990 | Tamura ......................... 455/78 |
| 5,065,120 | 11/1991 | Munn ........................... 333/207 |
| 5,406,617 | 4/1995 | Bauer .......................... 379/61 |
| 5,428,826 | 6/1995 | Masaki ....................... 455/161.2 |
| 5,613,229 | 3/1997 | Baranowski et al. .......... 455/127 |
| 5,675,629 | 10/1997 | Raffel et al. .................. 379/58 |
| 5,712,603 | 1/1998 | Kim et al. .................... 333/101 |
| 5,715,525 | 2/1998 | Tarusawa et al. ............. 455/101 |
| 5,742,589 | 4/1998 | Murata ........................ 370/249 |
| 5,781,864 | 7/1998 | Reudink ....................... 455/560 |
| 5,809,405 | 9/1998 | Yamaura ....................... 455/101 |

Primary Examiner—Wellington Chin
Assistant Examiner—Sheila Smith
Attorney, Agent, or Firm—Banner & Witcoff, Ltd.

[57] ABSTRACT

A wireless base station has a transmitter and receiver. Transmission signals are applied to an antenna through a transmit bandpass filter that is tuned for a transmit band of frequencies. Received signals from the antenna are applied to the receiver through a receive bandpass filter that is tuned for a receive band of frequencies. An RF switching array consisting of four RF switches interconnects the output of the transmitter and the input of the receiver such that normal, loopback (self-test), and scanning modes can be performed. In the normal mode, the antenna is connected to the transmitter and receiver through the transmit and receive bandpass filters, respectively. The transmit and signal paths are effectively isolated from each other by three serially-connected open switches. In the loopback mode, the transmitter output is connected to the receiver input. In the scanning mode, the antenna is connected to the receiver through the transmit bandpass filter. The same set of interconnects provides for loopback and normal operation as well as the new scanning operation. The use of switches rather than couplers or couplers for the loopback function reduces noise and crosstalk between transmit and receive signal lines and lower losses in these lines.

16 Claims, 4 Drawing Sheets

TRANSCEIVER WITH RF LOOPBACK AND DOWNLINK FREQUENCY SCANNING

TECHNICAL FIELD

The invention relates to RF transceivers and more specifically to automated setup of cellular service base stations.

BACKGROUND OF THE INVENTION

Wireless services are becoming increasingly popular and the demand for the limited supply of bandwidth for such services is increasing. New ways of supplying service to a larger population of users has resulted in the development of cellular technology which allows access to more users by limiting the range of transceiver base stations, and the mobile transceivers with which they communicate, to geographic cells. The smaller the individual cells (the shorter the range), the more users that can be supplied with service. Current cells with a 3 to 5 mile radius stand in contrast with much smaller ranges of microcells and picocells with transmission radii down to 100 feet or less.

With a need for to install smaller, and consequently more numerous, cells comes a need for adding and replacing base stations. This is expensive and labor intensive. Currently, to set up a base station transceiver, an RF engineer must determine the available channels and the available coverage area by performing channel measurements using a special transceiver with its own antenna. Manually setting up base stations ("drive tests") is time-consuming and expensive because it requires human labor and additional equipment. Also, determining the available channels from an antenna that is not identical nor located at the same position as the antenna of the base-station introduces inaccuracies in the channel determinations. Moreover, if conditions change, for example, due to replacement of an adjacent base station with one or more new base stations, the coverage area and channel allocation must be performed again.

SUMMARY AND OBJECTS OF THE INVENTION

It is an object of the invention to provide an apparatus that permits automatic channel allocation of a transceiver.

It is another object of the invention to provide a transceiver capable of accurate determination of RF channels in use in a service area.

It is still another object of the invention to provide a transceiver that is capable of highly accurate determination of RF transmissions of wireless transceivers in its coverage area that are likely to interfere with it.

It is still another object of the invention to provide a transceiver, that transmits in a transmitting band of frequencies and receives in a receiving band of frequencies, that is capable of selectively receiving or transmitting in the transmitting band of frequencies or some other band of frequencies.

Briefly, a wireless base station has a transmitter and receiver that use separate transmit and receive bands to simplify duplexing and share a common antenna. Transmission signals are applied to an antenna through a transmit bandpass filter that is tuned for a transmit band of frequencies. Received signals from the antenna are applied to the receiver through a receive bandpass filter that is tuned for a receive band of frequencies. An RF switching array consisting of four RF switches interconnects the output of the transmitter and the input of the receiver such that normal, loopback (self-test), and scanning modes can be performed.

In the normal mode, the antenna is connected to the transmitter and receiver through the transmit and receive bandpass filters, respectively. The transmit receive signal paths are effectively isolated from each other by three serially-connected open switches. In the loopback mode, the transmitter output is connected to the receiver input. In the scanning mode, the antenna is connected to the receiver through the transmit bandpass filter. The same set of interconnects provides for loopback and normal operation as well as the new scanning operation. The use of switches rather than splitters or combiners for the loopback function reduces noise and crosstalk between transmit and receive signal lines and minimizes losses in these lines.

According to an embodiment of the invention, there is provided a transceiver with a transmitter, a receiver having an input, a transmit bandpass filter, and a receive bandpass filter. Each filter is connected to an external medium to apply signals to the external medium. The transmit bandpass filter is tuned for passing a first frequency band and the receive bandpass filter is tuned for passing a second frequency band. The transmit bandpass filter is selectably connectable during a normal mode, through a switching device, to the transmitter, whereby signals from the transmitter are applied to the external medium. The transmit bandpass filter is also selectably connectable, during a scanning mode and through the switching device, to the receiver, whereby signals in the first frequency range passed by the transmit bandpass filter may be received by the receiver.

According to another embodiment of the invention, there is provided a base-station transceiver for a wireless cellular network, with a transmitter and a receiver. A transmit bandpass filter and a receive bandpass filter are each connected to an external medium via an antenna. The transmit bandpass filter is tuned to pass a first frequency band and the receive bandpass filter is tuned to pass a second frequency band. A switching device interconnects the transmitter, the receiver, the transmit bandpass filter, and the receive bandpass filter. The switching device is configurable to connect the transmit bandpass filter to the transmitter during a normal mode of operation thereby permitting signals from the transmitter to be applied to said external medium. The switching device is also configurable to connect the transmitter to the receiver during a testing mode of operation thereby permitting the receiver to receive signals from its own transmitter without passing through the external medium. The switching device is also configurable to connect the transmit bandpass filter to the receiver during a scanning mode of operation thereby permitting the receiver to receive signals, in the first frequency band, from the external medium.

According to still another embodiment of the invention, there is provided a transceiver, having a transmitter configured to transmit over a transmit frequency range. The receiver is selectively configurable to receive over a receive frequency range or the transmit frequency range. A controller connected to the receiver has a memory. The controller is programmed to cause the receiver to receive wireless signals from external transmitters, the wireless signals being within the transmit frequency range. Each of the wireless signals is transmitted over a one of a predefined set of channels used by the transceiver for transmission of data by the transmitter. The controller is programmed to generate a list in the memory indicative of those of the set of channels over which the wireless signals are transmitted in response to a reception of the wireless signals.

DESCRIPTION OF THE PREFERRED EMBODIMENTS

Figure 1A:
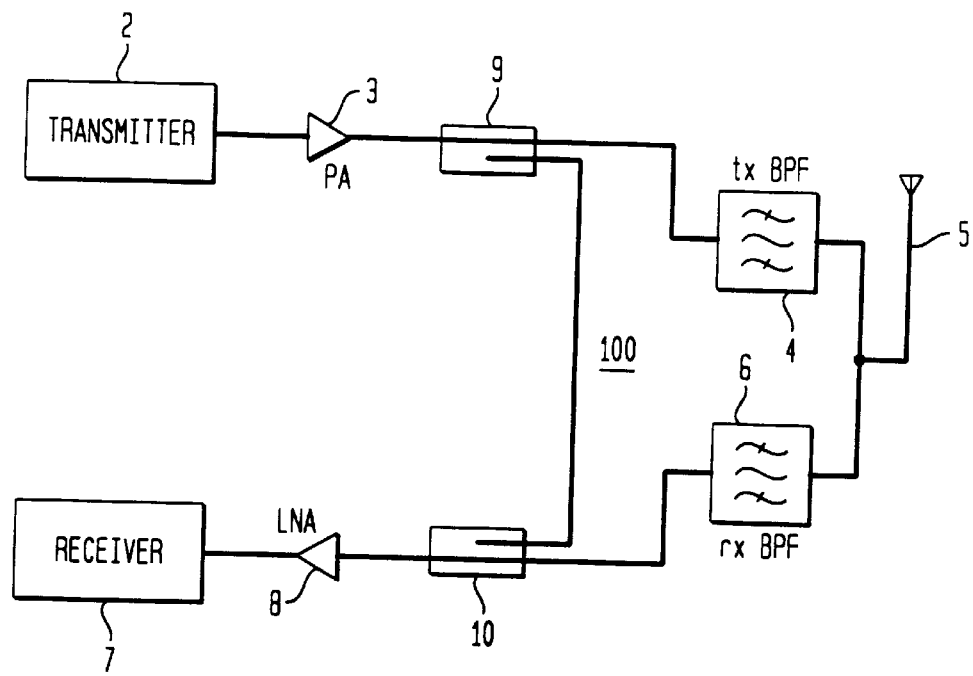
FIG. 1A illustrates a cellular transceiver of the prior art.

Referring to FIG. 1A, a prior art embodiment of a transceiver 100 includes a transmitter 2 that applies transmission signals through a transmit power amplifier (PA) 3 and a transmit bandpass filter 4 to an antenna 5. Transmit bandpass filter 4 is tuned to a transmit range of frequencies allocated for transmission of wireless signals to mobile wireless terminals (not shown). Signals in a receive range of frequencies, picked up by antenna 5, are applied through a receive bandpass filter 6 and a low noise amplifier (LNA) 8 to a receiver 7. For loopback self-testing, a coupler 9 samples a portion of transmission signals from transmitter 2 and applies them through coupler 10 to receiver 7.

Prior art transceiver 100 enters a diagnostic mode in which it outputs certain signals generated by transmitter 2 through coupler 9 and combiner 10 to receiver 7. Receiver 7 picks up the diagnostic signals and performs certain operations to determine operating parameters and verify that the receiver and transmitter are operating properly. During normal operation, transmission signals generated by transmitter 2 are applied to antenna 5 and signals received by wireless stations (not shown) are applied to receiver 7. Transmission signals may interfere with received signals due to the coupling of the transmitter 2 output and receiver 7 input by coupler 8 and combiner 10.

Figure 1B:
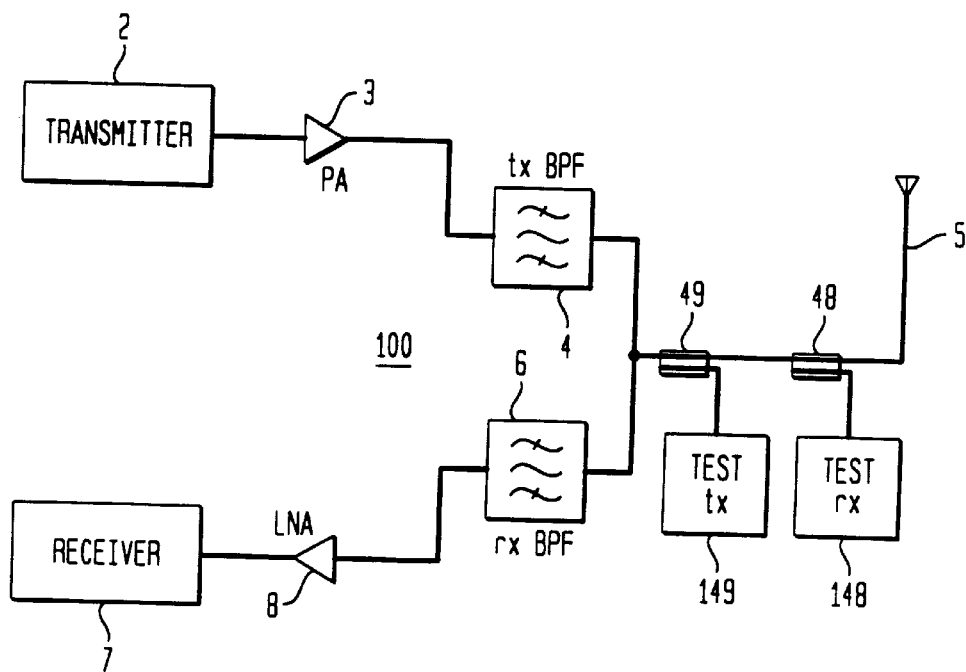
FIG. 1B is a test setup for testing the transmitter and receiver of a transceiver of the prior art.

Referring to FIG. 1B, an alternative prior art system for testing receiver 7 and transmitter 2 employs an external test transmitter 149 and a test receiver 149 coupled to the transceiver 100 antenna line by couplers 49 and 48, respectively. To test receiver 7, test transmitter 149 applies a modulated signal directly to the antenna line. To test transmitter 2, test receiver 148 picks up a modulated signal directly from the antenna line.

Figure 2:
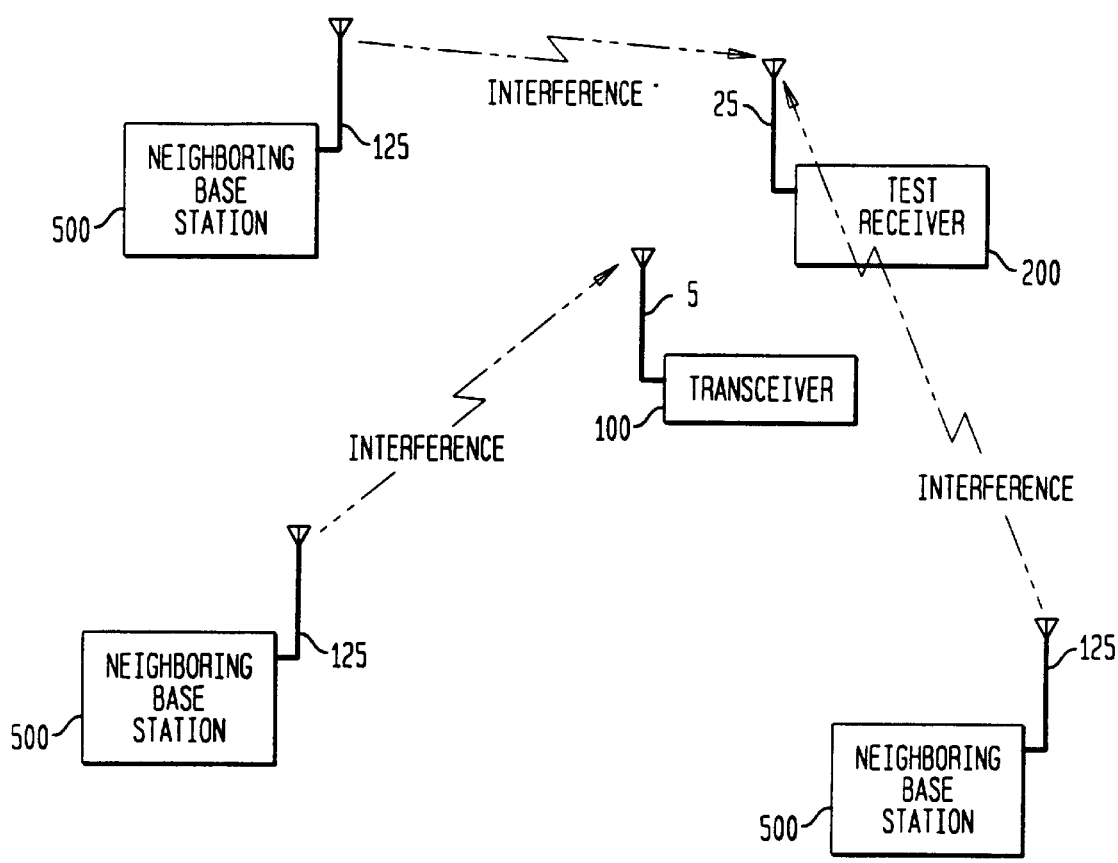
FIG. 2 illustrates a configuration for setting up a cellular transceiver according to the prior art.

Referring to FIG. 2, to set up prior art transceiver 100, a scanning receiver 200 with its own antenna 25 is used. Within scanning receiver 200 is a receive bandpass filter 24 tuned to pass only signals in the transmit range of frequencies. Once transceiver 100 is installed, scanning receiver 200 must be used to determine which channels are available. These channels may be frequency bands or coded signals (e.g., CDMA), or some other kind of wireless channel. To do this, scanning transceiver "listens" for transmission by neighboring transceivers 500 and logs those channels that it detects. This information is then used to generate a list of available channels which is recorded in a memory of a controller of transceiver 100. Note that because scanning receiver 200 employs its own antenna 25, which occupies a different physical location from that occupied by antenna 5, the response of receiver 200 to the signals from neighboring transceivers is not identical to that of transceiver 100. In fact, as is well known in the art, there can be significant differences between the response of a receiver due to an apparently minor change in location. Differences in the configuration of antenna 25 of receiver 200 can also result in differences in its response. These differences lead to errors in the scanning results with consequent collision of neighboring transceivers or a failure to use a channel that would be appropriate to use.

Figure 3:
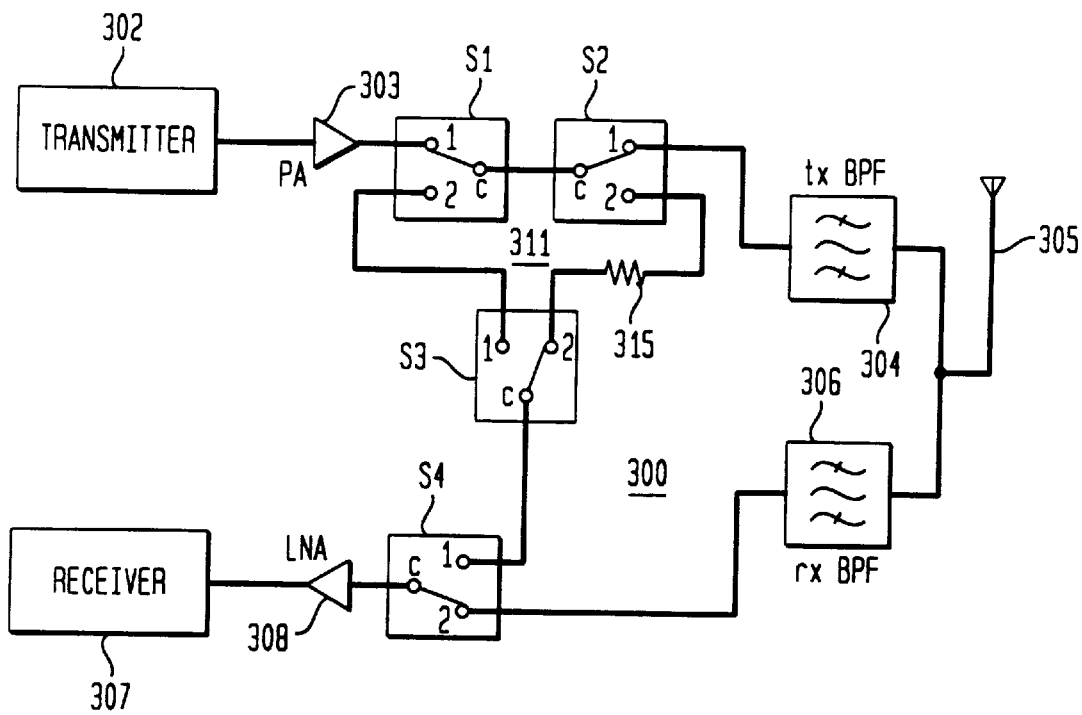
FIG. 3 illustrates a cellular transceiver according to an embodiment of the invention in a normal mode.

Referring to FIG. 3, a transceiver 300, according to an embodiment of the invention, includes a transmitter 302 that applies transmission signals through a transmit power amplifier (PA) 303 and a transmit bandpass filter 304 to an antenna 305. Transmit bandpass filter 304 is tuned to a transmit range of frequencies allocated for transmission of wireless signals to mobile wireless terminals (not shown). Signals in a receive range of frequencies, picked up by antenna 305, are applied through a receive bandpass filter 306 and a low noise amplifier (LNA) 308 to a receiver 307.

Receiver 307 input and transmitter 302 output are interconnected by a switch set 311 located upstream of transmit bandpass filter 304 and downstream of receive bandpass filter 306. Switch set 311, in a preferred embodiment, includes four RF single pole-double throw (SPDT) RF switches S1, S2, S3, and S4 interconnected as shown. Switch S2, position 2 and switch S3, position 2 are interconnected through an attenuator 315.

When transmitter 302 is set for normal operation, switch S1 is set to position 1, switch S2 to position 1, switch S3 to position 2, and switch S4 to position 2. Signals from wireless stations (not shown) are received by antenna 305 and applied through receive bandpass filter 306 and switch S4 to receiver 307. Signals generated by transmitter 302 are applied to antenna 305 through switch S1, S2 and transmit bandpass filter 304. During normal operation, the output of transmitter 302 is isolated from the input of receiver 307 by a series parallel network having three open switches on one serial leg (switches S1, S3, and S4) and two open switches and an attenuator on the serial other leg (switch S2, attenuator 315, and switch S4). This configuration of disconnectable interconnects (switches S1–S4) provides better isolation than the prior art scheme employing couplers.

Figure 4:
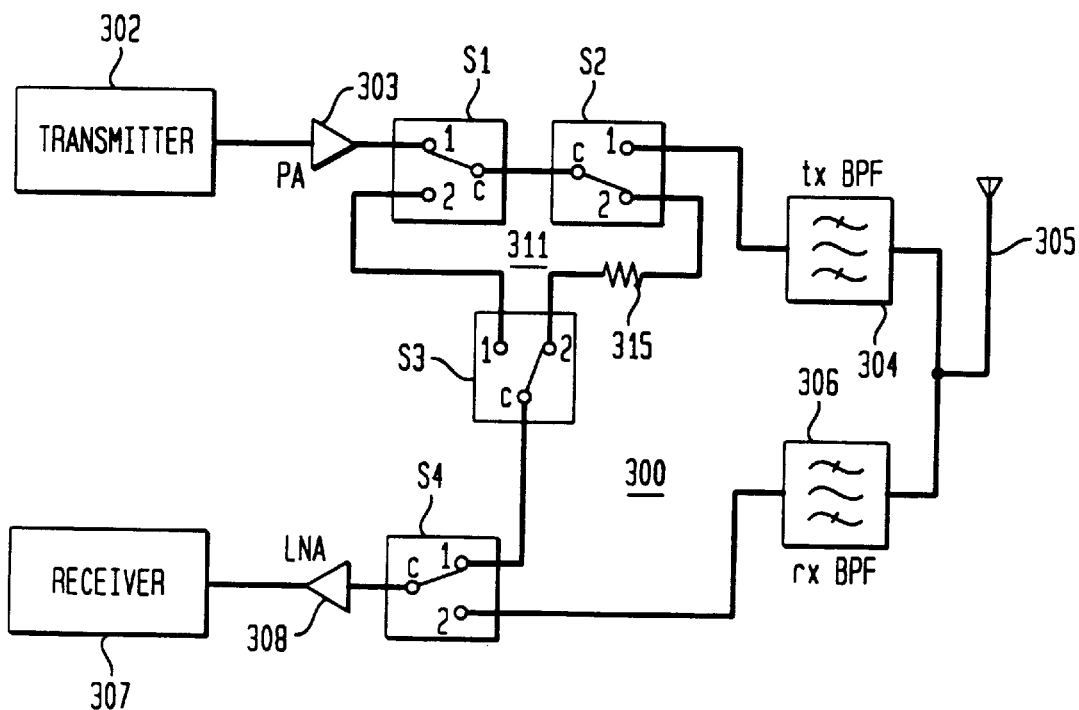
FIG. 4 illustrates a cellular transceiver according to an embodiment of the invention in a loopback mode.

Referring to FIG. 4, during a cell diagnostic operation, transmitter 302 and receiver 307 are commanded to go into RF loopback mode to prepare transmitter 302 to apply diagnostic signals to receiver 307. At the same time, or at some time before actual diagnostics are run, switch S1 is set to position 1, switch S2, to position 2, switch S3 to position 2, and switch S4 to position 1. As a result, signals transmitted by transmitter 302 are directly applied through switches S1, S2, S3, and S4 to receiver 307. A local oscillator (not shown) of receiver 302 is a wideband oscillator allowing it to tune to the transmit frequency range (as well as the receive frequency range), thereby allowing receiver 307 to demodulate signals transmitted by transmitter 302.

Figure 5:
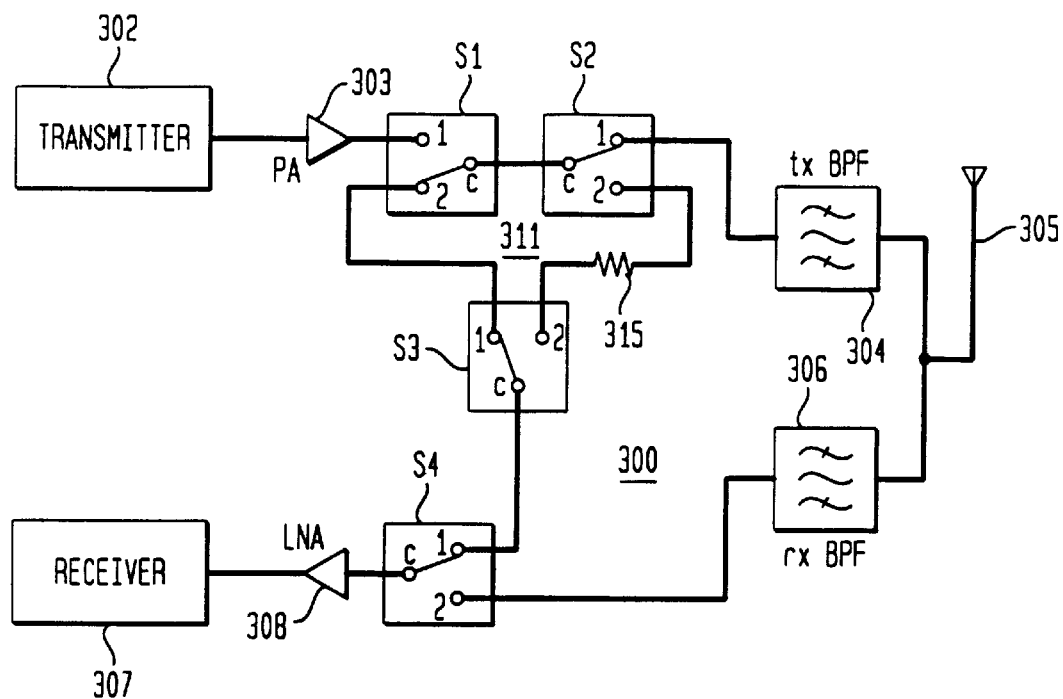
FIG. 5 illustrates a cellular transceiver according to an embodiment of the invention in a scan mode.

Referring to FIG. 5, during a scanning mode, the local oscillator (not shown) of receiver 307 is set for receiving a frequency band in the transmit range. Switch S1 is set to position 2, switch S2, to position 2, switch S3 to position 1, and switch S4 to position 1. Signals received by antenna 305 are applied to receiver 307 through the path consisting of switch S2, switch S1, switch S3, and switch S4. As a result of these switch settings, the signals from antenna 305 pass through transmit bandpass filter 304. Receiver 307 is programmed to perform automatically an operation corresponding to the scanning operation described above. Receiver 307 "listens" for transmission by neighboring transceivers like transceiver 100 and logs those channels that it can detect. A list is then generated of available channels (unused) which is then utilized by transceiver 300's internal programming to transmit data.

Figure 6:
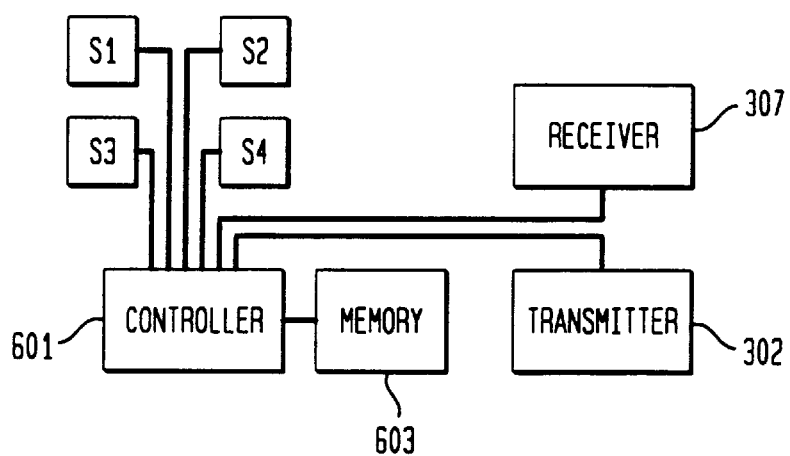
FIG. 6 illustrates control elements of a cellular transceiver according to the invention.

Referring to FIG. 6, a controller 601 is connected to switches S1–S4, transmitter 302 and receiver 307. Controller 601 places switches S1–S4 in the appropriate positions for scanning mode. In scanning mode, controller 601 is programmed to read step-wise through a list of available channels in a memory 603, configuring receiver 207 at each step to listen for transmissions on each channel in turn, and, upon detection of an intelligible signal on the channel, to record an indicator of that channel in a list of unavailable channels in memory 603. Once this is done, controller accesses the list of available channels to determine which channels are available to it. Controller 601 has an internal clock (not shown) that allows it to update the list periodically by going into the scanning mode and checking available channels allowing the list of "clean" channels to be updated periodically.

I claim:

1. A transceiver, comprising:

a transmitter configured to transmit over a transmit frequency range;

a receiver selectively configurable to receive over a receive frequency range and said transmit frequency range;

a controller connected to said receiver;

said controller having a memory;

said controller being programmed to cause said receiver to receive wireless signals from external transmitters;

said wireless signals being within said transmit frequency range;

each of said wireless signals being transmitted over a one of a predefined set of channels used by said transceiver for transmission of data by said transmitter;

said controller being programmed to generate a list in said memory indicative of those of said set of channels over which said wireless signals are transmitted in response to a reception of said wireless signals;

said controller being further programmed to re-generate said list iteratively at specified intervals of time and to permit said transmitter to transmit only over channels other than channels in said list.

2. A transceiver as in claim 1, further comprising:

a transmit bandpass filter and a receive bandpass filter each being connected to an external medium via an antenna; and a switching device;

said transmitter having an output;

said receiver having an input;

said transmit bandpass filter being tuned to pass a first frequency band;

said receive bandpass filter being tuned to pass a second frequency band;

said switching device interconnecting said transmitter, said receiver, said transmit bandpass filter, and said receive bandpass filter;

said switching device being configurable to connect said transmit bandpass filter to said transmitter during a normal mode of operation thereby permitting signals from said transmitter to be applied to said external medium over which said wireless signals are transmitted by said external transmitters;

said switching device being configurable to connect said transmitter to said receiver during a testing mode of operation thereby permitting said receiver to receive signals from said transmitter;

said switching device being configurable to connect said transmit bandpass filter to said receiver during a scanning mode of operation thereby permitting said receiver to receive signals, in said first frequency band, from said external medium.

3. A transceiver as in claim 2, wherein:

said switching device includes four single-pole double-throw radio frequency switches;

first and second switches of said four switches forming a first serial network connecting said transmitter to said transmit bandpass filter when said first and second switches are in respective first positions; and said first and second and third and fourth of said four switches forming a second serial network connecting said input and said output when at least one of said first and second switches is in a second position to place said switching device in position enabling said receiver to be used to test said transmitter.

4. A transceiver comprising:

a transmitter having an output;

a receiver having an input;

a transmit bandpass filter and a receive bandpass filter each connected to an external medium;

a switching device;

said transmit bandpass filter being tuned to pass a first frequency band;

said receive bandpass filter being tuned to pass a second frequency band;

said switching device being configurable to connect said transmitter to said receiver during a testing mode of operation thereby permitting said receiver to receive signals from said transmitter; and said switching device being configurable to connect said transmit bandpass filter to said receiver during a scanning mode of operation thereby permitting said receiver to receive signals, in said first frequency band, from said external medium.

5. A transceiver as in claim 4, further comprising:

a controller, connected to configure said switching device, said controller having a memory;

said controller being programmed to place said switching device in said scanning mode and to generate a list in said memory of data indicative of wireless channels in use by other base stations in response to information received by said receiver.

6. A transceiver as in claim 4, wherein said switching device includes at least one RF switch.

7. A transceiver as in claim 4, wherein said transmit and receive bandpass filters are each connected to an antenna.

8. A transceiver as in claim 4, wherein:

said switching device being configurable to connect said transmit bandpass filter to said transmitter during a normal mode of operation thereby permitting signals from said transmitter to be applied to said external medium.

9. A transceiver as in claim 8, wherein:

said switching device includes at least three radio frequency switches capable of being placed in respective first and second positions;

said at least three switches are connected to form a serial network between said input and said output; and said serial network forms three discontinuities when said at least three switches are in respective first positions corresponding with said normal mode, whereby said input and said output are isolated from each other with respect to said serial network.

10. A transceiver as in claim 9, wherein said serial network connects said transmit bandpass filter with said receiver when at least one of said at least three switches is in a second position.

11. A transceiver as in claim 4, wherein:

said switching device includes four single-pole double-throw radio frequency switches;

first and second switches of said four switches forming a first serial network connecting said transmitter to said transmit bandpass filter when said first and second switches are in respective first positions;

said first and second and third and fourth of said four switches forming a second serial network connecting said input and said output when at least one of said first and second switches is in a second position.

12. A transceiver as in claim 11, wherein said second serial network includes an attenuator.

13. A transceiver as in claim 12, wherein said first, second, third, and fourth switches form a third serial network connecting said transmit bandpass filter to said receiver, said third serial network bypassing said attenuator.

14. A transceiver, comprising:

a transmitter having an output;

a receiver having an input;

a transmit bandpass filter and a receive bandpass filter each connected to an external medium;

a switching device;

said transmit bandpass filter being tuned to pass a first frequency band;

said receive bandpass filter being tuned to pass a second frequency band;

said transmit bandpass filter being selectably connectable, during a normal mode, through said switching device, to said transmitter, whereby signals from said transmitter are applied to said external medium;

said transmit bandpass filter being selectably connectable during a scanning mode, through said switching device, to said receiver, whereby signals in said first frequency band, passed by said transmit bandpass filter, may be received by said receiver; and said switching device includes four single pole-double throw RF switches configured so that said output is isolated from said input along at least one path, said at least one path including three switches of said four RF switches serially interconnected along said first path.

15. A transceiver as in claim 14, wherein said switching device selectably interconnects said output to said input, whereby said receiver is enabled to receive signals from said transmitter.

16. The transceiver as in claim 14, said at least one path being two parallel paths, at least one of said two parallel paths including a signal attenuator.

* * * * *